(12) United States Patent (10) Patent No.: US 9,239,829 B2
Kato et al. (45) Date of Patent: Jan. 19, 2016

(54) SPEECH RECOGNITION DEVICE

(75) Inventors: Yoichi Kato, Tokyo (JP); Jun Ishii, Tokyo (JP); Hiroki Sakashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 445 days.

(21) Appl. No.: 13/702,330

(22) PCT Filed: Oct. 1, 2010

(86) PCT No.: PCT/JP2010/005918
§ 371 (c)(1),
(2), (4) Date: Dec. 6, 2012

(87) PCT Pub. No.: WO2012/042578
PCT Pub. Date: Apr. 5, 2012

(65) Prior Publication Data
US 2013/0080146 A1 Mar. 28, 2013

(51) Int. Cl.
*G06F 17/28* (2006.01)
*G10L 15/00* (2013.01)
*G10L 15/26* (2006.01)

(52) U.S. Cl.
CPC .............. *G06F 17/28* (2013.01); *G10L 15/005* (2013.01); *G10L 15/26* (2013.01)

(58) Field of Classification Search
CPC ....... G10L 15/26; G10L 15/063; G10L 15/18; G10L 15/197; G10L 15/06; G10L 2015/0631; G10L 15/00; G10L 15/144; G10L 25/48; G10L 15/28; G10L 13/08; G10L 17/04
USPC .............. 704/1–10, 251, 255, 257, 243, 244, 704/254, 235, 231
See application file for complete search history.

(56) References Cited

U.S. PATENT DOCUMENTS

2003/0191643 A1 10/2003 Belenger et al.
2004/0073423 A1 4/2004 Freedman
(Continued)

FOREIGN PATENT DOCUMENTS

JP 2002-73082 A 3/2002
JP 2004-53825 A 2/2004
(Continued)

OTHER PUBLICATIONS

Sadaoki Furui, "Onsei jyoho shori (Speech Information Processing)", Morikita Publishing, pp. 79-132, 1998.
(Continued)

*Primary Examiner* — Huyen Vo
(74) *Attorney, Agent, or Firm* — Birch, Stewart, Kolasch & Birch, LLP

(57) ABSTRACT

A speech recognition device includes: a speech recognition unit 23a that performs speech recognition for input speech; a reading information conversion data base in which a reading information conversion rule L is registered; a reading information conversion unit 27a that converts reading information of the word among the languages based on the rule L; and a speech recognition control unit 24a that performs control such that, when a word in a different language that is different from a predetermined language is included in a recognition subject vocabulary in which a speech recognition unit 23a refers to recognition subject word information E, the unit 27a converts the reading information in the different language into reading information in the predetermined language, and that the unit 23a performs the speech recognition that makes reference to the recognition subject word information of the corresponding word, including the converted reading information in the predetermined language.

3 Claims, 13 Drawing Sheets

(56) References Cited

U.S. PATENT DOCUMENTS

| | | | |
|---|---|---|---|
| 2004/0078191 A1 | 4/2004 | Tian et al. | |
| 2004/0098259 A1* | 5/2004 | Niedermair | 704/254 |
| 2004/0204942 A1* | 10/2004 | Lee | 704/254 |
| 2008/0270118 A1 | 10/2008 | Kuo et al. | |
| 2010/0131262 A1* | 5/2010 | Gruhn et al. | 704/8 |
| 2012/0226491 A1 | 9/2012 | Yamazaki et al. | |

FOREIGN PATENT DOCUMENTS

| | | |
|---|---|---|
| JP | 2004-170466 A | 6/2004 |
| JP | 2004-271895 A | 9/2004 |
| JP | 2005-31150 A | 2/2005 |
| JP | 2005-44075 A | 2/2005 |
| JP | 2005-332089 A | 12/2005 |
| JP | 2009-37633 A | 2/2009 |
| JP | 2009-175630 A | 8/2009 |
| JP | 2010-525415 A | 7/2010 |
| WO | WO 2011/096015 A1 | 8/2011 |

OTHER PUBLICATIONS

Sumitomo et al., "Trie Kozo o Mochiita Tagengo Taiyaku Jisho no Koritsuteki Asshuku Shuho", Dai 61 Kai (Heisei 12 Nen Koki) Zenkoku Taikai Koen Ronbunshu (2), Jinko Chino to Ninchi Kagaku, pp. 2-133-2-134, Oct. 3, 2010.

* cited by examiner

| Writing | Reading | Language |
|---|---|---|
| GREAT BRITAIN | greit britn | UK English |
| LONDON | lʌndə n | UK English |
| MAIN STREET | mein striːt | UK English |
| DEUTSCHLAND | də ytʃlant | German |
| BERLIN | bə rlin | German |
| JAPAN | nippon | Japanese |
| TOKYO | toːkyoː | Japanese |
| ... | | |

English Reading
→ Japanese Reading
Conversion Rule

| English | Japanese |
|---------|----------|
| e | e |
| nə r | na |
| ʤ i | jii |
| ... | |

FIG.9

| English Writing → Japanese Reading Generation Rule | |
|---|---|
| English | Japanese |
| E | e |
| NER | neru |
| GY | gii |
| ... | |

FIG.14

| German → English Writing Conversion Rule | |
|---|---|
| German | English |
| Ä | A |
| Ü | U |
| Ö | O |
| ß | SS |

SPEECH RECOGNITION DEVICE

TECHNICAL FIELD

The present invention relates to a speech recognition device that performs speech recognition corresponding to a plurality of languages.

BACKGROUND ART

A conventional speech recognition device disclosed in Patent Document 1 selectively uses the speech recognition data base corresponding to the information of the present location where the corresponding device is located, thereby achieving highly accurate speech recognition. For example, when the present location is the Kansai region, a sound and a language model of the Kansai dialect are selected, and speech recognition is performed using the selected ones. Further, when the present location is a train station, a recognition dictionary that includes a large number of words related to travels, for example, is selected, and the speech recognition is performed using the selected one.

Patent Document 2 discloses a speech recognition system corresponding to a plurality of languages, wherein a recognition dictionary dedicated to a plurality of languages is provided, and the phonetic information in a different language from the writing or phonetic notation in the corresponding language together with the phonetic information in a language are registered in the dictionary. A plurality of languages can be recognized by referring to the recognition dictionary.

PRIOR ART DOCUMENTS

Patent Documents

Patent Document 1: Japanese Patent Application Laid-Open No. 2009-175630
Patent Document 2: Japanese Patent Application Laid-Open No. 2004-271895

SUMMARY OF THE INVENTION

However, in the conventional speech recognition device represented by Patent Document 1, a large number of sound models and recognition dictionaries has to be stored in the system in order to achieve high precision speech recognition, and a large capacity storage means is required. Moreover, Patent Document 1 does not correspond to speech recognition for a plurality of languages.

On the other hand, though the conventional speech recognition device represented by Patent Document 2 supports a plurality of languages, there are problems such that the phonetic information in a different language has to be generated and stored in advance before starting speech recognition, and that the speech recognition cannot be carried out for a language of which the phonetic information has not been stored in advance.

The present invention is made to solve the aforementioned problems, and an object of the invention is to provide a speech recognition device such that a large capacity storage means is unnecessary and that speech recognition corresponding to a plurality of languages can be carried out in a real-time processing.

A speech recognition device of the present invention includes: a speech recognition unit that performs speech recognition for input speech with a speech recognition engine corresponding to a predetermined language that is a language that is set in advance as a recognition subject, by referring to recognition subject word information including writing information and reading information of each recognition subject word included in a recognition subject vocabulary registered in a speech recognition dictionary; a reading information conversion data base in which a reading information conversion rule indicating a correspondence of reading information of a word among a plurality of languages is registered; a reading information conversion unit that converts the reading information of the word among the languages based on the reading information conversion rule of the reading information conversion data base; and a control unit that performs control such that, when a word in a different language that is different from the predetermined language is included in the recognition subject vocabulary in which the speech recognition unit refers to the recognition subject word information, the reading information conversion unit converts reading information in the different language into reading information in the predetermined language, and that the speech recognition unit performs speech recognition that makes reference to recognition subject word information of the corresponding word including the converted reading information in the predetermined language.

According to the invention, there is an advantageous effect such that a large capacity storage means is unnecessary and that the speech recognition corresponding to the plurality of languages can be carried out in a real-time processing.

BRIEF DESCRIPTION OF THE DRAWINGS

FIG. 9 is a diagram showing one example of a reading information conversion data base.

FIG. 14 is a diagram showing one example of a writing conversion data base.

BEST MODE FOR CARRYING OUT THE INVENTION

In the following, embodiments of the present invention will now be described with reference to the accompanying drawings in order to explain the present invention in more detail.

Embodiment 1

Figures 1, 2:
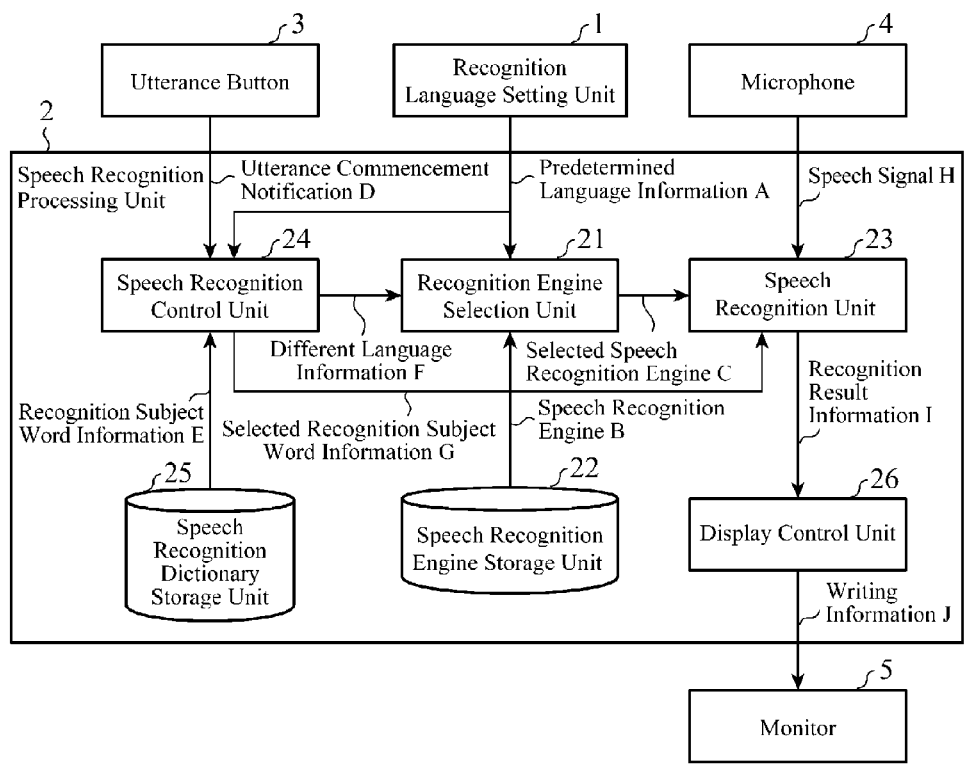
FIG. 1 is a block diagram showing a configuration of a speech recognition device according to Embodiment 1 in the present invention.
FIG. 2 is a diagram showing one example of a speech recognition dictionary.

FIG. 1 is a block diagram showing a configuration of a speech recognition device according to Embodiment 1 in the present invention. In a case where a word in a language that is different from a predetermined language that is set as a subject for speech recognition (hereinafter, properly referred to as 'different language') is included in a recognition subject vocabulary, the speech recognition device in Embodiment 1 temporarily starts up a speech recognition engine of the corresponding different language, and performs speech recognition. Also, for such a constitution, as shown in FIG. 1, the device includes a recognition language setting unit 1, a speech recognition processing unit 2, an utterance button 3, a microphone 4, and a monitor 5.

The recognition language setting unit 1 is a constitutional part that a user sets a recognition subject language, and provides, for example, a man-machine interface for setting a language using hardware that can serve as an interface with the outside of the device such as a monitor 5 and an input device. If the user sets a recognition subject language, predetermined language information A indicating the corresponding language is notified from the recognition language setting unit 1 to the recognition engine setting unit 21 and the speech recognition control unit 24.

The utterance button 3 is a button for notifying the start of utterance of the user to the speech recognition device, and if the button is pressed by the user, an utterance commencement notification D indicating the start of utterance is outputted to the speech recognition control unit 24. Also, the utterance button 3 is carried out by a software button displayed on a screen of the monitor 5, a hardware button disposed around the screen frame of the monitor 5, or the like.

The microphone 4 is a constitutional part that converts the speech uttered by the user into a speech signal H of an electric signal, and transmits the resultant to the speech recognition unit 23. The monitor 5 is a display device that displays the information acquired by the speech recognition processing unit 2 on the screen, as displaying processing thereof is controlled by the display control unit 26. For example, the recognition result is presented to the user, when the writing information J of the recognized word is displayed on the screen of the monitor 5.

The speech recognition processing unit 2 is a constitutional part that recognizes the speech uttered by the user, and presents the recognition result to the user, and includes a recognition engine selection unit 21, a speech recognition engine storage unit 22, a speech recognition unit 23, a speech recognition control unit 24, a speech recognition dictionary storage unit 25 and a display control unit 26.

The recognition engine selection unit (selection unit) 21 is a constitutional part that, based on the predetermined language information A notified from the recognition language setting unit 1, selects a speech recognition engine in the predetermined language out of all the speech recognition engines (speech recognition engine B) stored in the speech recognition engine storage unit 22, and selects a speech recognition engine in a language indicated by different language information F if the different language information F is notified. The speech recognition engine selected by the recognition engine selection unit 21 is set in the speech recognition unit 23 as a speech recognition engine C to be executed upon speech recognition processing.

The speech recognition dictionary storage unit 25 is a storage part that stores a speech recognition dictionary in which recognition subject word information (recognition subject word information E) that indicates the writing, reading and language of the recognition subject vocabulary is registered.

The speech recognition engine storage unit (storage unit) 22 is a storage part that stores the speech recognition engines corresponding to a plurality of languages, respectively. It is noted that the speech recognition engine is a program module for performing recognition processing for the speech uttered by the user by referring to the recognition subject word information in the recognition subject vocabulary to output recognition result information I indicating the recognition result (text data of recognized words and so on).

The speech recognition unit 23 is a constitutional part that executes the speech recognition engine C to be set in the recognition engine selection unit 21, and performs recognition processing for the speech signal H input from the user through the microphone 4, by referring to recognition subject word information G selected by the speech recognition control unit 24, as mentioned later. The recognition result information I of the speech recognition unit 23 is transmitted to the display control unit 26. The display control unit 26 is a constitutional part that inputs the recognition result information I of the speech recognition unit 23, and outputs the information to the monitor 5 as writing information J of a recognition vocabulary. The monitor 5 displays the writing information J of the recognition vocabulary on the screen.

The speech recognition control unit (control unit) 24 is a constitutional part that refers to the recognition subject word information E of the speech recognition dictionary stored in the speech recognition dictionary storage unit 25 if the utterance commencement notification D is input, and selects the recognition subject word information G of the recognition subject vocabulary to be used at the current recognition processing out of the recognition subject word information E, and outputs the information to the speech recognition unit 23. Further, if it is determined that a word in a language that is different from the predetermined language is included in the recognition subject vocabulary to be used at the current recognition processing, the speech recognition control unit 24 outputs the different language information F indicating the corresponding language that is different from the predetermined language to the recognition engine selection unit 21. In such a way, the speech recognition control unit 24 performs control such that using the speech recognition engine corresponding to the language that is different from the predetermined language, the speech recognition unit 23 performs the speech recognition that makes reference to the recognition subject vocabulary in the language that is different from the corresponding predetermined language.

FIG. 2 is an example of the speech recognition dictionary. As shown in FIG. 2, the writing, reading and language of the recognition subject word are registered in the speech recognition dictionary stored in the speech recognition dictionary storage unit 25. It is noted that in Embodiment 1, a speech recognition dictionary in which the recognition subject word information E of the words in a plurality of languages (UK English, German and Japanese) are registered together is used as shown in FIG. 2.

Further, when a speech recognition program in accordance with the purport in the present invention is executed by a computer, the recognition engine selection unit 21, the speech recognition engine storage unit 22, the speech recognition unit 23, the speech recognition control unit 24, the speech recognition dictionary storage unit 25 and the display control unit 26 can be achieved on the corresponding computer as a specific means cooperating hardware and software.

Next, an operation thereof will be described.

Figure 3:
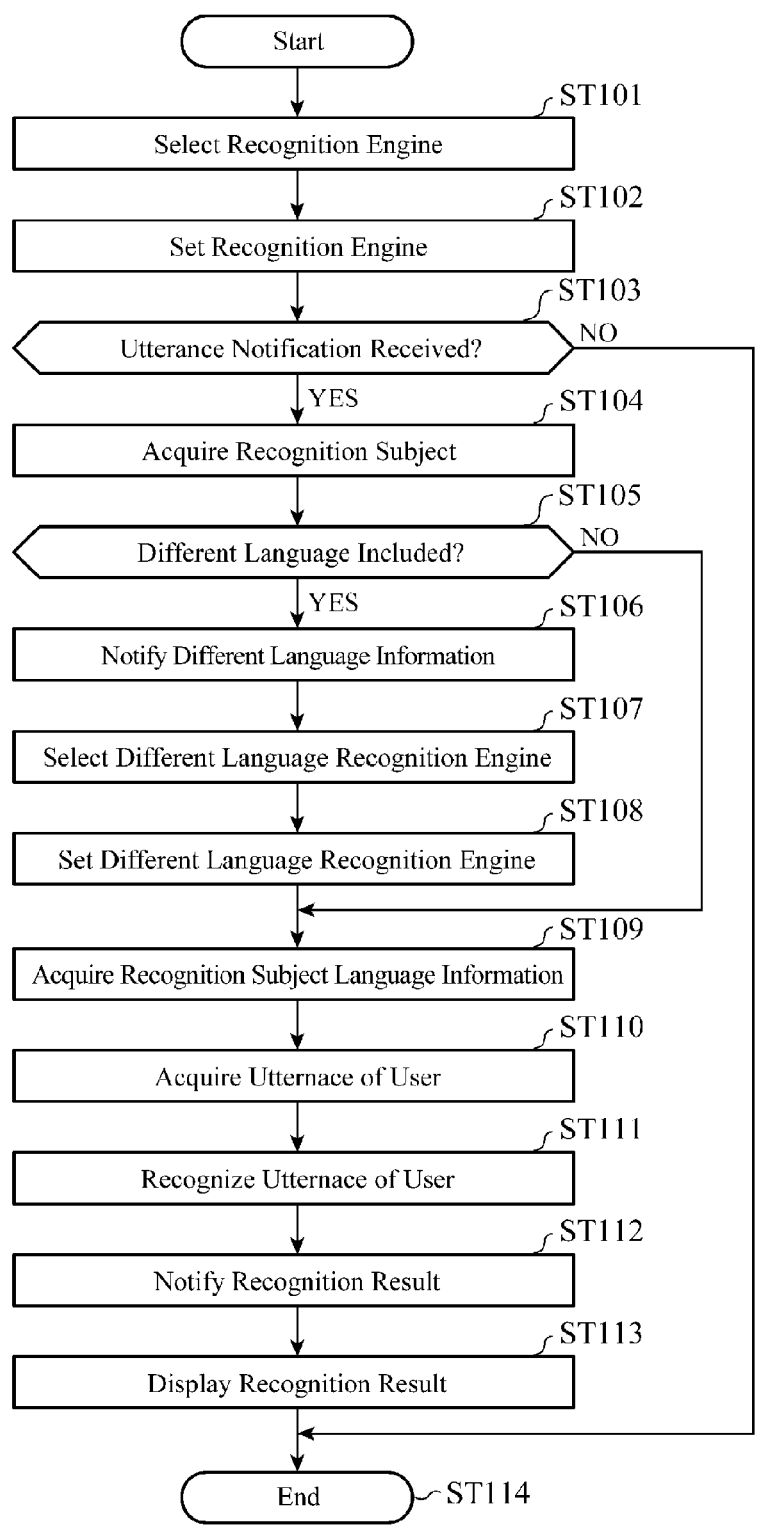
FIG. 3 is a flow chart showing an operation flow according to the speech recognition device in Embodiment 1.

FIG. 3 is a flow chart showing an operation flow according to the speech recognition device in Embodiment 1, especially showing the details of the processing by the speech recognition processing unit 2.

First, the user sets a recognition subject language by using the recognition language setting unit 1. Therefore, the predetermined language information A that indicates the language that is set by the user is notified from the recognition language setting unit 1 to the recognition engine selection unit 21. The recognition engine selection unit 21 refers to the speech recognition engine B stored in the speech recognition engine storage unit 22, and selects the speech recognition engine C of the language indicated by the predetermined language information A out of the speech recognition engine B (step ST101). Thereafter, the recognition engine selection unit 21 sets the speech recognition engine C in the speech recognition unit 23 (step ST102).

For example, when the user would like to set German as the recognition subject language, German is set by way of the man-machine interface provided by the recognition language setting unit 1. Therefore, the predetermined language information A that indicates German is notified from the recognition language setting unit 1 to the recognition engine setting unit 21, and based on the predetermined language information A, the recognition engine setting unit 21 selects the speech recognition engine corresponding to German out of the speech recognition engine B, and sets the resultant to the speech recognition unit 23.

Then, the speech recognition control unit 24 determines whether an utterance commencement notification D is received or not because of the pressing of the utterance button 3 by the user (step ST103). If the utterance commencement notification D is not received (step ST103: NO), the processing ends.

If the utterance commencement notification D is received (step ST103: YES), the speech recognition control unit 24 refers to the recognition subject word information E in the speech recognition dictionary stored in the speech recognition dictionary storage unit 25, and selects and acquires the recognition subject word information G in the recognition subject vocabulary to be used at the current recognition processing out of the recognition subject word information E (step ST104).

Hereupon, as a selection standard of the recognition subject vocabulary, for example, the immediately preceding recognition results are specified.

In other words, based on the recognition result information I acquired from the speech recognition unit 23, the speech recognition control unit 24 selects the recognition subject word information in the recognition subject vocabulary to be used at the current recognition processing out of the recognition subject word information E. As illustrated in a case where a "geographical name" is speech recognized, if a country name "Great Britain" is recognized from the recognition result information I in the immediately preceding speech recognition processing, the speech recognition control unit 24 acquires the recognition subject word information with respect to the vocabulary of all the geographical names belonging to "Great Britain" out of the recognition subject word information E.

As mentioned above, the speech recognition control unit 24 selects the whole recognition subject vocabulary to be used at the recognition processing out of the recognition subject word information E in accordance with a standard to select a vocabulary such that there is a strong likelihood to be used in a speech recognition situation, regardless whether the language of the words included in the recognition subject vocabulary is the predetermined one or not, and acquires these recognition subject word information (recognition subject word information G) thereof.

Then, by referring to the language information included in the recognition subject word information G (for example, UK English, German, and so on shown in FIG. 2), the speech recognition control unit 24 determines whether or not a word in the language information that is different from the predetermined language information A (different language) is included in the vocabulary of the recognition subject word information G (step ST105). At this point, if the word in the different language is included (step ST105: YES), based on the above language information, the speech recognition control unit 24 notifies the different language information F indicating which language and which word are included as the different language to the recognition engine selection unit 21 (step ST106).

Based on the different language information F notified from the speech recognition control unit 24, the recognition engine selection unit 21 refers to the speech recognition engine B stored in the speech recognition engine storage unit 22, and selects a speech recognition engine of the language indicated by the different language information F out of the speech recognition engine B (step ST107), and sets the corresponding speech recognition engine as well in the speech recognition unit 23 as the speech recognition engine C (step ST108).

For example, if English is the predetermined language and a word in German is included in the recognition subject vocabulary, the speech recognition engine of German is selected and set.

It is noted that if words in a plurality of different languages such as German and French are included in the recognition subject vocabulary, a plurality of speech recognition engines corresponding to these languages may be selected and set in the speech recognition unit 23.

On the other hand, if a word in the different language is not included (step ST105: NO), the processing moves to step ST109, and the processes of step ST106 to step ST108 are not executed.

At step ST109, the speech recognition unit 23 acquires the recognition subject word information G selected at step ST104 from the speech recognition control unit 24.

Thereafter, if a speech signal H input from the user through the microphone 4 is acquired (step ST110), the speech recognition unit 23 executes the speech recognition engine C and recognizes which word the user uttered by referring to the recognition subject word information G according to a method described in Chapter 5 of the following Reference Document 1 (step ST111).

(Reference Document 1)

Sadaoki Furui, *Onsei jyoho shori* (Speech Information Processing), Morikita Publishing, Tokyo, 1998

If the recognition subject vocabulary includes a word in the predetermined language and a word in a language that is different from the predetermined language (different language), the speech recognition engine C corresponding to the different language is temporarily started up, inputs one uttered speech into the speech recognition engine C corresponding to a plurality of languages at the same time, performs recognition processing (recognition processing according to Reference Document 1), and acquires a recognition result for each language engine. The recognition results corresponding to all the languages are arranged in the sequence of higher scores (representing likelihood of the recognition results), resulting in the final recognition results. However, if the recognition subject vocabulary includes only the words of the different language, the speech recognition unit 23 stops execution of the speech recognition engine C corresponding to the predetermined language, temporarily starts up the speech recognition engine C corresponding to the different language, and performs recognition processing using the recognition subject vocabulary in the corresponding different language.

If the recognition processing is completed, the speech recognition unit 23 outputs the recognition result information I of the corresponding processing to the display control unit 26 (step ST112). The display control unit 26 presents the writing information J included in the recognition result information I to the user through the monitor 5 as the recognition result (step ST113), and then the system ends the processing (step ST114).

As described above, according to the present Embodiment 1, the speech recognition device includes: the speech recognition engine storage unit 22 that stores a plurality of speech recognition engines corresponding to a plurality of languages, respectively; the recognition engine selection unit 21 that selects the speech recognition engine corresponding to the predetermined language out of the plurality of speech recognition engines stored in the speech recognition engine storage unit 22; the speech recognition unit 23 that performs speech recognition for input speech with the speech recognition engine selected by the recognition engine selection unit 21 by referring to the recognition subject word information including the writing information and reading information of each recognition subject word included in the recognition subject vocabulary registered in the speech recognition dictionary; and the speech recognition control unit 24 that performs control such that, when a word in a language that is different from the predetermined language (different language) is included in the recognition subject vocabulary to which the speech recognition unit 23 refers, the recognition engine selection unit 21 selects a speech recognition engine corresponding to the different language out of the plurality of speech recognition engines stored in the speech recognition engine storage unit 22, and that the speech recognition unit 23 performs speech recognition that makes reference to the word in the above different language using the corresponding speech recognition engine.

As mentioned above, when the word in the language that is different from the language set in advance is included, the speech recognition engine corresponding to the corresponding language is temporarily started and the speech recognition is performed, which eliminates a large capacity storage means, and it becomes possible to perform the speech recognition corresponding to the plurality of languages in a real-time processing.

Embodiment 2

In Embodiment 2, if the word in a language that is different from a predetermined language (different language) is included in a speech recognition dictionary, the reading information of the corresponding word assigned by the different language is converted into the reading information in the predetermined language, and with the after-conversion-reading information, the corresponding word is recognized by the speech recognition engine of the predetermined language.

Figures 4, 5:
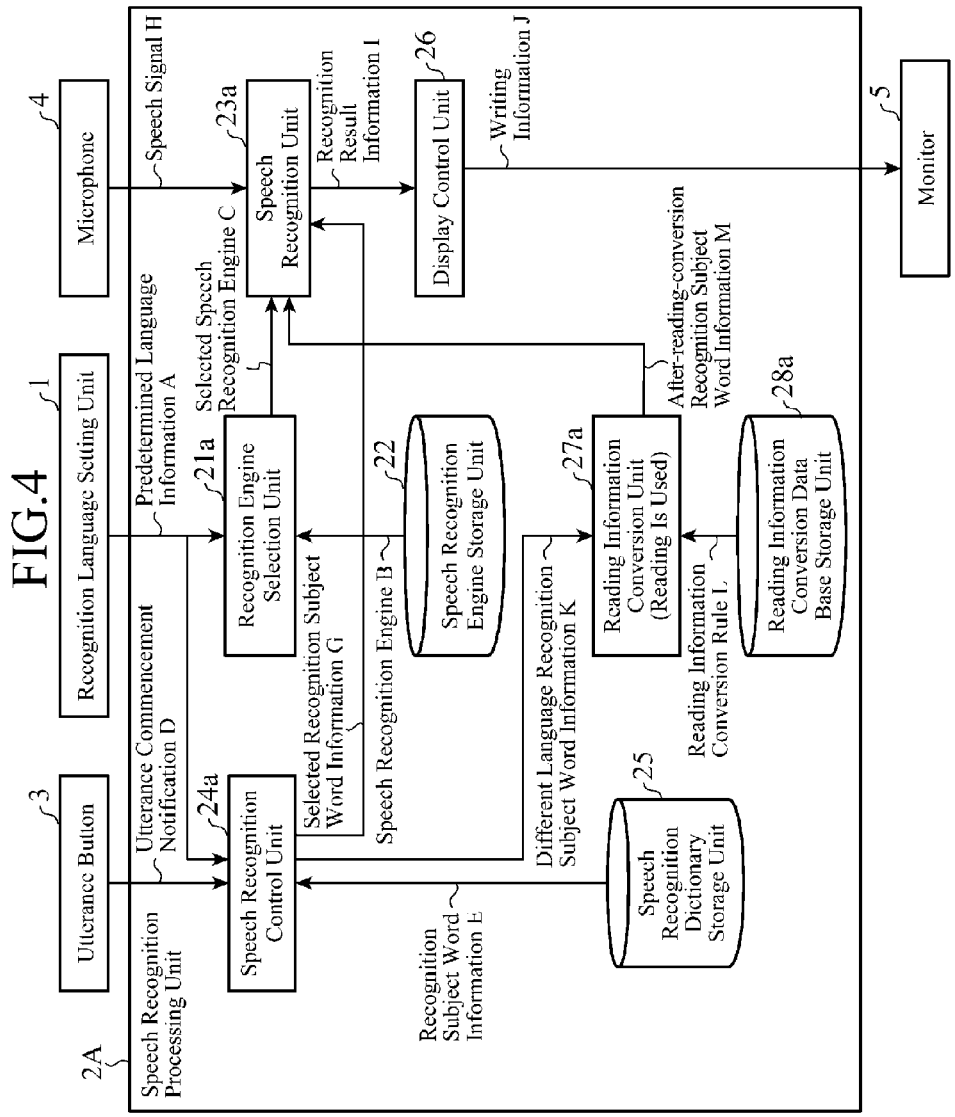
FIG. 4 is a block diagram showing a configuration of a speech recognition device according to Embodiment 2 in the invention.
FIG. 5 is a diagram showing one example of a reading information conversion data base.

FIG. 4 is a block diagram showing a configuration of a speech recognition device according to Embodiment 2 in the invention. In FIG. 4, a recognition language setting unit 1, an utterance button 3, a microphone 4 and a monitor 5 are the same configurations as those of FIG. 1 described in the above Embodiment 1. A speech recognition processing unit 2A in Embodiment 2 has a recognition engine selection unit 21a, a speech recognition engine storage unit 22, a speech recognition unit 23a, a speech recognition control unit 24a, a speech recognition dictionary storage unit 25, a display control unit 26, a reading information conversion unit 27a and a reading information conversion data base storage unit 28a.

It is noted that in the speech recognition processing unit 2A, the speech recognition engine storage unit 22, the speech recognition dictionary storage unit 25 and the display control unit 26 are the same configurations as those in FIG. 1 described in the above Embodiment 1.

The recognition engine selection unit (selection unit) 21a is a constitutional part that, based on the predetermined language information A notified from the recognition language setting unit 1, selects a speech recognition engine C in the predetermined language out of all the speech recognition engines (speech recognition engine B) stored in the speech recognition engine storage unit 22.

The speech recognition control unit 24a is a constitutional part that selects recognition subject word information G in a recognition subject vocabulary to be used at the current recognition processing out of recognition subject word information E of a speech recognition dictionary stored in the speech recognition dictionary storage unit 25 if an utterance commencement notification D is input, and outputs the information to the speech recognition unit 23a.

Further, if a word in a language that is different from the predetermined language is included in the recognition subject vocabulary to be used at the current recognition processing, the speech recognition control unit 24a selects the recognition subject word information of the word in the corresponding different language out of the recognition subject word information E, and outputs the information to the reading information conversion unit 27a as the different language recognition subject word information K. In such a way, the speech recognition control unit 24a performs control such that the speech recognition unit 23a performs speech recognition that makes reference to the recognition subject vocabulary after the converted reading information by the reading information conversion unit 27a.

The reading information conversion data base storage unit 28a is a storage part that stores a reading information conversion data base. In the reading information conversion data base, a reading information conversion rule L that indicates the correspondence of the reading information in the vocabulary among a plurality of languages is stored.

The reading information conversion unit 27a is a constitutional part that converts the reading information of a word in the corresponding different language included in the different language recognition subject word information K input from the speech recognition control unit 24a into the reading information in the predetermined language in accordance with the reading information conversion rule L to be read from the reading information conversion data base storage unit 28a. The recognition subject word information after the conversion into the reading information in the predetermined language is output to the speech recognition unit 23a as after-reading-conversion recognition subject word information M.

FIG. 5 is a diagram showing one example of the reading information conversion data base, and shows the reading information conversion rule L from readings in English to readings in Japanese. For example, if the predetermined language is Japanese and "ENERGY" in English is included in the recognition subject vocabulary, a reading of the word "ENERGY" is converted into a reading in Japanese as "enajii" in accordance with the reading information conversion rule L in FIG. 5.

The speech recognition unit 23a is a constitutional part that executes the speech recognition engine C selected by the recognition engine selection unit 21a, and thereby performs speech recognition processing for a speech signal H input from the user through the microphone 4, by referring to the recognition subject word information G selected by the speech recognition control unit 24a and the recognition subject word information M after the conversion of the reading information by the reading information conversion unit 27a. The recognition result information I acquired as a result of the recognition processing by the speech recognition unit 23a is transmitted from the speech recognition unit 23a to the display control unit 26.

Further, when a speech recognition program in accordance with the purport in the present invention is executed by a computer, the recognition engine selection unit 21a, the speech recognition engine storage unit 22, the speech recognition unit 23a, the speech recognition control unit 24a, the speech recognition dictionary storage unit 25, the display control unit 26, the reading information conversion unit 27a and the reading information conversion data base storage unit 28a can be achieved on a computer as a specific means cooperating hardware and software.

Next, an operation thereof will be described.

Figure 6:
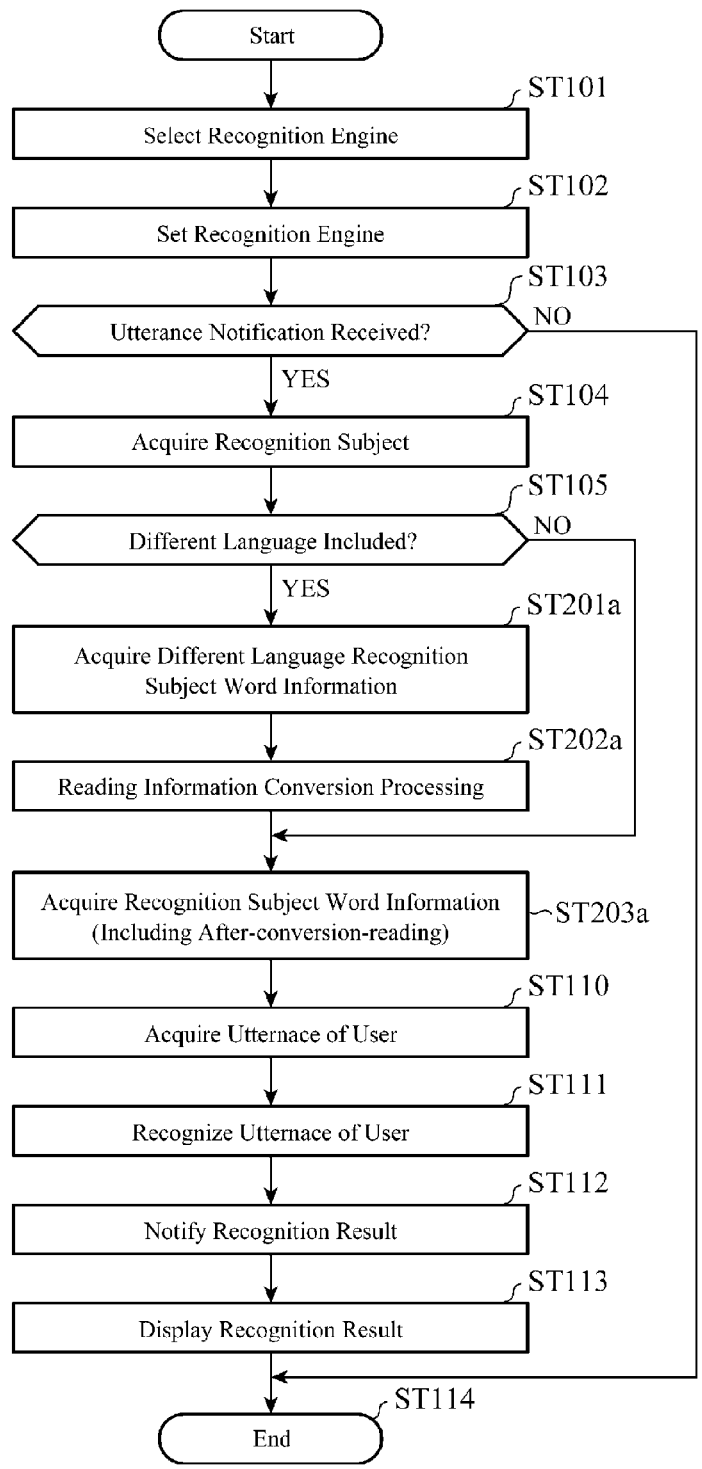
FIG. 6 is a flow chart showing an operation flow according to the speech recognition device in Embodiment 2.

FIG. 6 is a flow chart showing an operation flow according to the speech recognition device in Embodiment 2, especially showing the details of the processing by the speech recognition processing unit 2A. In FIG. 6, processes of step ST101 to step ST105 are the same as the contents of the processes in FIG. 3 described in the above Embodiment 1.

If a word in the different language is included in the recognition subject vocabulary (step ST105: YES), the speech recognition control unit 24a refers to the recognition subject word information E in the speech recognition dictionary stored in the speech recognition dictionary storage unit 25 and acquires the corresponding different language recognition subject word information K, and outputs the information to the reading information conversion unit 27a (step ST201a).

The reading information conversion unit 27a, by referring to the reading information conversion data base storage unit 28a with the word in the different language recognition subject word information K input from the speech recognition control unit 24a as a key, specifies the reading information conversion rule L between the predetermined language and the different language, and then converts the reading information of the recognition subject word extracted from the different language recognition subject word information K into the reading information in the predetermined language in accordance with the corresponding reading information conversion rule L (step ST202a).

Figure 7:
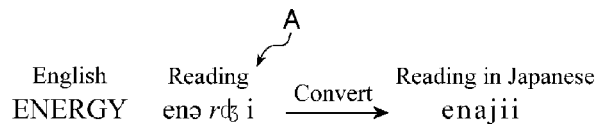
FIG. 7 is a diagram for illustrating a process for converting reading information of a word that is different from a predetermined language into reading information in the predetermined language.

FIG. 7 is a diagram for illustrating a process for converting reading information of a word in a language that is different from the predetermined language into the reading information in the predetermined language, and shows a case where the predetermined language is Japanese and the recognition subject vocabulary is "ENERGY" in English. If the reading of the word "ENERGY" in English (different language) is a reading indicated by the symbol A in FIG. 7, the reading information A in English is converted into reading information "enajii" in Japanese in accordance with the reading information conversion rule L shown in FIG. 5.

On the other hand, if a word in the different language is not included in the recognition subject vocabulary (step ST105: NO), the processing moves to step ST203a, and processes of step ST201a to step ST202a are not executed.

At step ST203a, the speech recognition unit 23a acquires the recognition subject word information G selected at step ST104 from the speech recognition control unit 24a, and also acquires the recognition subject word information M after the reading conversion by the reading information conversion unit 27a.

Then, if a speech signal H from the user input through the microphone 4 is acquired (step ST110), the speech recognition unit 23a executes the speech recognition engine C and makes speech recognition for which word the user uttered by referring to the recognition subject word information G and the recognition subject word information M according to the method described in Chapter 5 of Reference Document 1 mentioned above (step ST111).

Even if the recognition subject vocabulary includes a word in a language that is different from the predetermined language (different language), the speech recognition unit 23a executes the speech recognition engine C corresponding to the predetermined language, and performs recognition processing by referring to the recognition subject word information M after the conversion into the reading information in the predetermined language.

If the recognition processing is completed, the speech recognition unit 23a outputs the recognition result information I of the corresponding processing to the display control unit 26 (step ST112). The display control unit 26 presents the writing information J included in the recognition result information I to the user through the monitor 5 as a recognition result (step ST113), and the system ends the processing (step ST114).

As described above, according to Embodiment 2, the speech recognition device includes: the speech recognition unit 23a that performs speech recognition for input speech by using the speech recognition engine corresponding to the predetermined language set in advance as a recognition subject, and by referring to the recognition subject words registered in the speech recognition dictionary; a reading information conversion database in which the reading information conversion rule L that indicates a correspondence of reading information of a word among a plurality of languages is registered; the reading information conversion unit 27a that converts the reading information of the word among the languages, based on the reading information conversion rule L of the reading information conversion data base; and the speech recognition control unit 24a that performs control such that, if a word in a different language that is a language different from the language set in advance is included in the recognition subject vocabulary in which the speech recognition unit 23a refers to the recognition subject word information E, the reading information conversion unit 27a converts the reading information in the different language into the reading information in the predetermined language, and that the speech recognition unit 23a performs the speech recognition by referring to the recognition subject word information of the corresponding word that includes the converted reading information in the predetermined language.

As mentioned above, when the reading information of the corresponding predetermined language is generated from the reading information of the word in the different language that is different from the predetermined language, it becomes possible to recognize the word in the different language without switching the predetermined language. In this case, when the user utters the word in a pronunciation close to the pronunciation of the above different language that is different from the predetermined language, speech recognition becomes possible. Also, there is an advantage such that that since the reading information can be generated in a real-time processing, the reading information in the predetermined language that corresponds to the word in the corresponding different language need not be stored in the speech recognition dictionary in advance.

Embodiment 3

In Embodiment 3, if a word in a language that is different from a predetermined language (different language) is included in a speech recognition dictionary, the reading information of the corresponding word in the predetermined language is generated based on the writing information of the corresponding word in the different language, and the corresponding word is recognized by a speech recognition engine of the predetermined language using the generated reading information.

Figure 8:
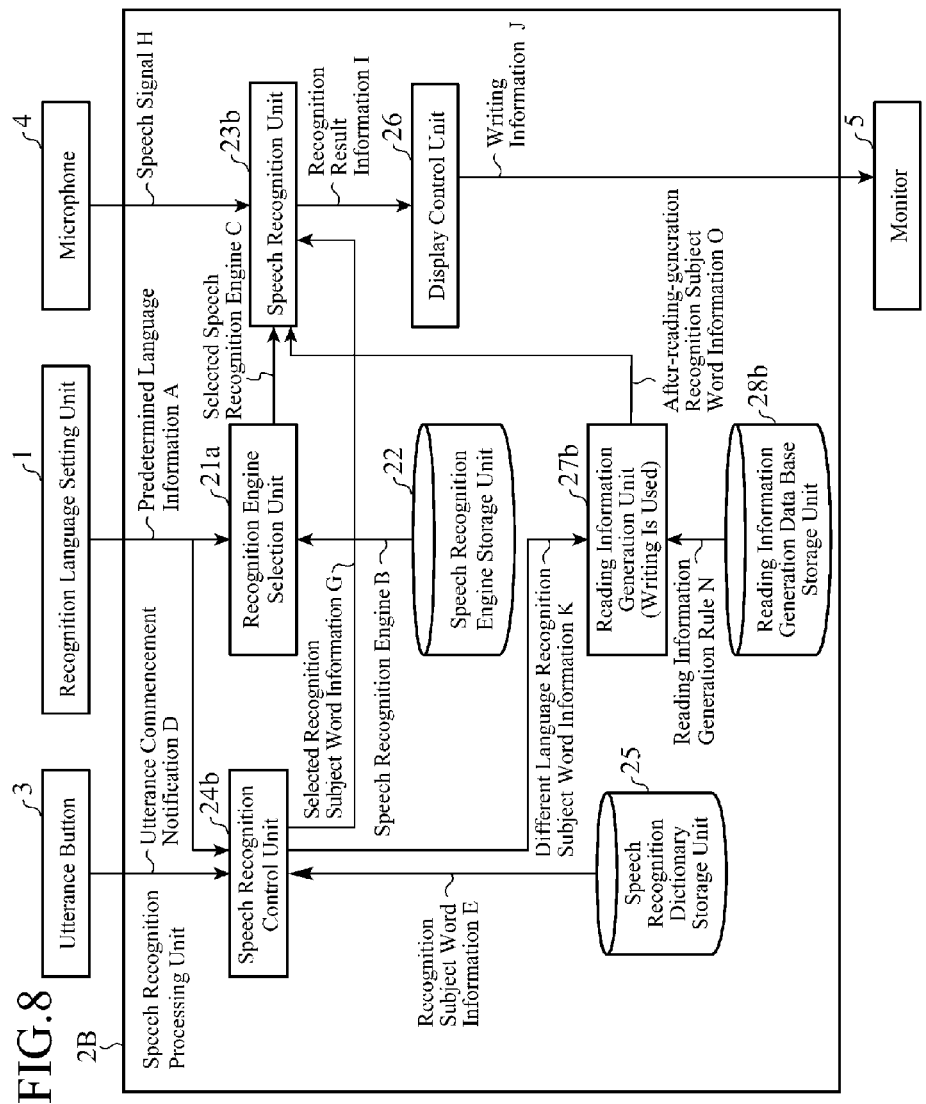
FIG. 8 is a block diagram showing a configuration of a speech recognition device according to Embodiment 3 in the invention.

FIG. 8 is a block diagram showing a configuration of a speech recognition device according to Embodiment 3 in the invention. In FIG. 8, a recognition language setting unit 1, an utterance button 3, a microphone 4 and a monitor 5 are the same configurations as hose in FIG. 1 described in Embodiment 1. A speech recognition processing unit 2B in Embodiment 3 has a recognition engine selection unit 21a, a speech recognition engine storage unit 22, a speech recognition unit 23b, a speech recognition control unit 24b, a speech recognition dictionary storage unit 25, a display control unit 26, a reading information generation unit 27b, and a reading information generation data base storage unit 28b.

It is noted that in the speech recognition processing unit 2B, the recognition engine selection unit 21a, the speech recognition engine storage unit 22, the speech recognition dictionary storage unit 25, and the display control unit 26 are the same configurations as those in FIG. 1 described in the above Embodiment 1 and in FIG. 4 described in the above Embodiment 2.

The speech recognition control unit 24b is a constitutional part that selects recognition subject word information G in the recognition subject vocabulary to be used at the current recognition processing out of recognition subject word information E in a speech recognition dictionary stored in the speech recognition dictionary storage unit 25 if an utterance commencement notification D is input, and outputs the information to the speech recognition unit 23b.

Also, if a word in a language that is different from the predetermined language is included in the recognition subject vocabulary to be used at the current recognition processing, the speech recognition control unit 24b selects recognition subject word information of the word in the corresponding different language out of the recognition subject word information E, and outputs the information to the reading information generation unit 27b as different language recognition subject word information K. In such a way, the speech recognition control unit 24b performs control such that the speech recognition unit 23b performs speech recognition by referring to the recognition subject word information of the corresponding word after generation of the reading information by the reading information generation unit 27b.

The reading information generation data base storage unit 28b is a storage part that stores a reading information generation data base. In the reading information generation data base, a reading information generation rule N that indicates a correspondence between writing information in a vocabulary in one language among a plurality of languages and reading information in another language is stored.

The reading information generation unit 27b is a constitutional part that generates the reading information of the corresponding word in the predetermined language based on the reading information generation rule N read from the reading information generation data base storage unit 28b, by referring to the writing information of the word in the corresponding different language included in the different language recognition subject word information K input from the speech recognition control unit 24b. The recognition subject word information after generation of the reading information in the predetermined language is output to the speech recognition unit 23b as the after-reading-generation recognition subject word information O.

FIG. 9 is an example of the reading information conversion data base, and shows the reading information generation rule N in which writing information in English and corresponding reading information in Japanese are registered. For example, if the predetermined language is Japanese and "ENERGY" in English is included in the recognition subject vocabulary, reading "enerugii" in Japanese is generated from the writing information "ENERGY" in accordance with the reading information generation rule N in FIG. 9. In such a way, it is unnecessary to include both "enerugii" in Japanese and "ENERGY" in English in the recognition subject vocabulary.

The speech recognition unit 23b is a constitutional part that executes the speech recognition engine C selected by the recognition engine selection unit 21a, and performs speech recognition processing for a speech signal H input by the user through the microphone 4, by referring to the recognition subject word information G selected by the speech recognition control unit 24b and the recognition subject word information O after the reading generation by the information generation unit 27b. The recognition result information I acquired as a result of the recognition processing by the speech recognition unit 23b is transmitted from the speech recognition unit 23b to the display control unit 26.

Further, when a speech recognition program in accordance with the purport in the invention is executed by a computer, the recognition engine selection unit 21a, the speech recognition engine storage unit 22, the speech recognition unit 23b, the speech recognition control unit 24b, the speech recognition dictionary storage unit 25, the display control unit 26, the reading information generation unit 27b and the reading information generation data base storage unit 28b can be achieved on a computer as a specific means cooperating hardware and software.

Next, an operation thereof will be described.

Figure 10:
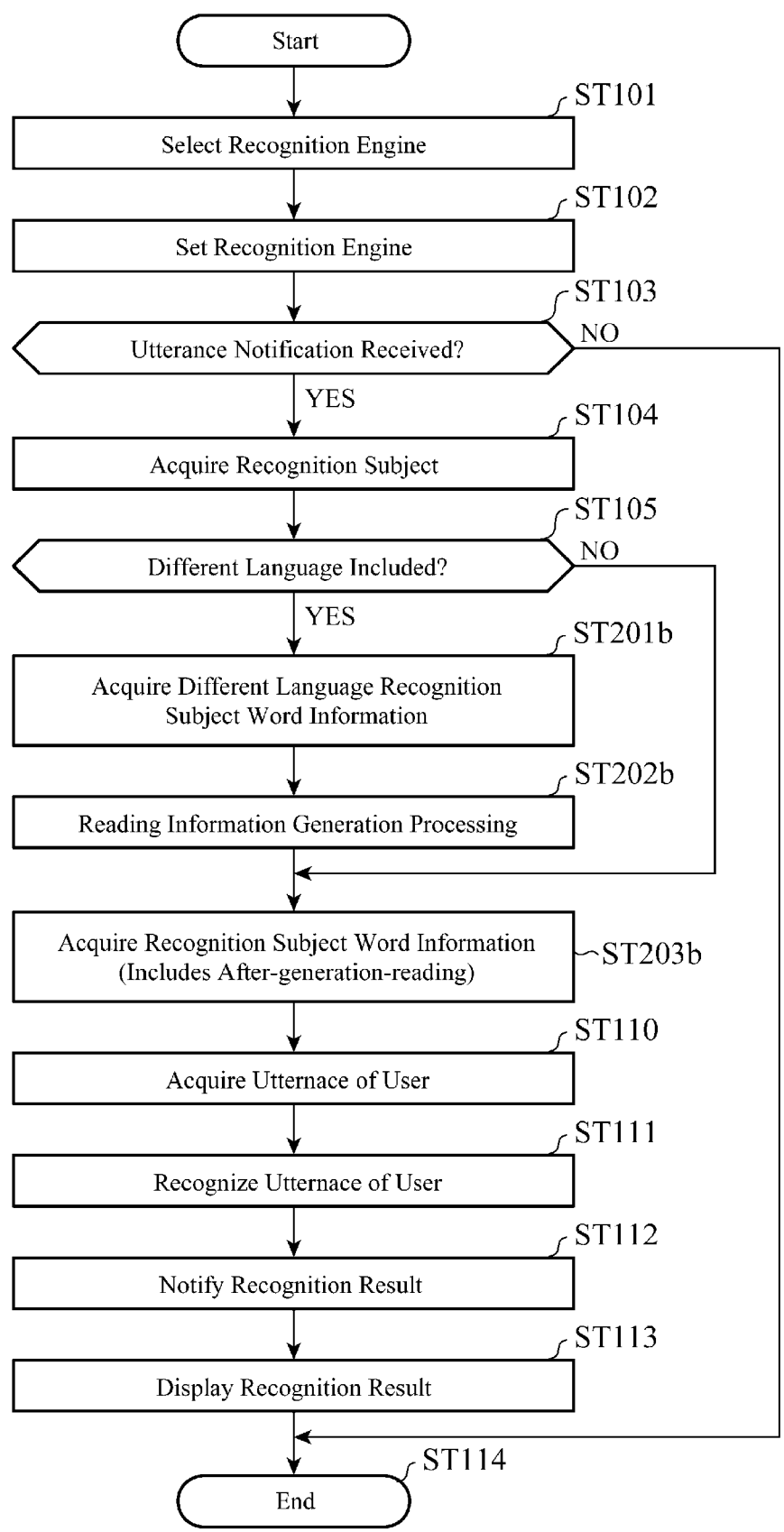
FIG. 10 is a flow chart showing an operation flow according to the speech recognition device in Embodiment 3.

FIG. 10 is a flow chart showing an operation flow according to the speech recognition device in Embodiment 3, especially showing the details of the processing by the speech recognition processing unit 2B. In FIG. 10, processes of step ST101 to step ST105 are the same as the contents of the processes in FIG. 3 described in the above Embodiment 1.

If a word in the different language is included in the recognition subject vocabulary (step ST105: YES), the speech recognition control unit 24b refers to the recognition subject word information E of the speech recognition dictionary stored in the speech recognition dictionary storage unit 25, and acquires the different language recognition subject word information K of the word in the corresponding different language, and outputs the information to the reading information generation unit 27b (step ST201b).

If the reading information generation rule N between the predetermined language and the different language is specified by reference to the reading information generation data base storage unit 28b with the word in the different language recognition subject word information K that is input from the speech recognition control unit 24b as a key, the reading information generation unit 27b generates the reading information in the predetermined language based on the corresponding reading information generation rule N by reference to the writing information of the word extracted from the different language recognition subject word information K (step ST202b).

For example, if the predetermined language is Japanese and the word in the different language is "ENERGY" in English, reading information "enerugii" in Japanese is generated from the writing information of the word "ENERGY" in English (different language) with the reading information generation rule N shown in FIG. 9.

On the other hand, if the word in the different language is not included in the recognition subject vocabulary (step ST105: NO), the processing moves to step ST203b, and processes of step ST201b to step ST202b are not executed.

At step ST203b, the speech recognition unit 23b acquires the recognition subject word information G selected at step S104 from the speech recognition control unit 24b, and acquires the recognition subject word information O after reading generation by the reading information generation unit 27b.

Then, if the speech signal H from the user input through the microphone 4 is acquired (step ST110), the speech recognition unit 23b executes the speech recognition engine C and performs speech recognition for which word the user uttered by referring to the recognition subject word information G and the recognition subject word information O by the method described in Chapter 5 of the Reference Document 1 mentioned above (step ST111).

Even if the recognition subject vocabulary includes a word in a language that is different from the predetermined language (different language), the speech recognition unit 23b executes the speech recognition engine C corresponding to the predetermined language, and performs recognition processing by referring to the recognition subject word information O after generation of the reading information in the predetermined language.

If the recognition processing is completed, the speech recognition unit 23b outputs the recognition result information I of the corresponding processing to the display control unit 26 (step ST112). The display control unit 26 presents the writing information J included in the recognition result information I to the user through the monitor 5 as a recognition result (step ST113), and the system ends the processing (step ST114).

As described above, according to Embodiment 3, the speech recognition device includes: the speech recognition unit 23b that recognizes input speech with the speech recognition engine corresponding to the predetermined language by referring to the recognition subject word information having the writing information and reading information of each recognition subject word included in the recognition subject vocabulary registered in the speech recognition dictionary; the reading information generation data base in which the reading information generation rule N that indicates a correspondence between the writing information in one language among a plurality of languages in the vocabulary and the reading information in another language is registered; the reading information generation unit 27b that generates the reading information in the another language from the writing information in the one language in the vocabulary, based on the reading information generation rule N; and the speech recognition control unit 24b that performs control such that, if a word in a different language that is different from the predetermined language is included in the recognition subject vocabulary in which the speech recognition unit 23b refers to the recognition subject word information E, the reading information generation unit 27b generates the reading information in the predetermined language from the writing information in the corresponding different language, and that the speech recognition unit 23b performs the speech recognition that makes reference to the recognition subject word information of the corresponding word after generation of the corresponding reading information.

As mentioned above, when the reading information corresponding to the predetermined language is generated from the writing information of the word in the different language that is different from the predetermined language, the word in the different language can be speech-recognized without switching the predetermined language. In this case, when the user utters the corresponding word in a pronunciation close to a pronunciation in the predetermined language, the speech recognition is possible. Also, there is an advantage such that since the reading information can be generated in a real-time processing, the reading information in the predetermined language that corresponds to the word of the corresponding different language need not be stored in the speech recognition dictionary in advance.

Embodiment 4

In Embodiment 4, if a word in a language that is different from a predetermined language (different language) is included in a speech recognition dictionary, the reading information of the word in the predetermined language is generated from both the reading information and the writing information of the corresponding word provided in the different language, and the corresponding word is recognized by the speech recognition engine in the predetermined language using the generated reading information.

Figure 11:
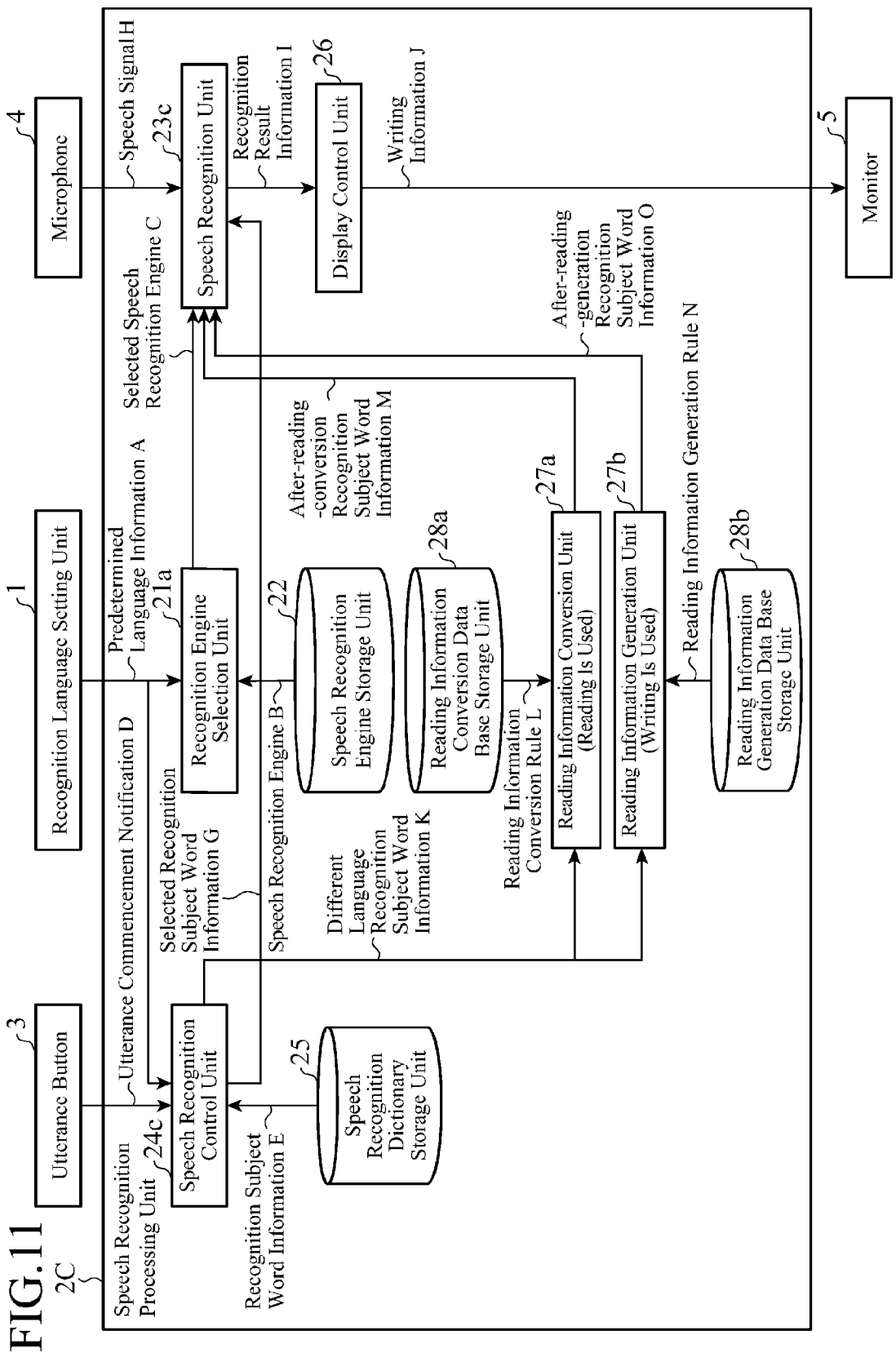
FIG. 11 is a block diagram showing a configuration of a speech recognition device according to Embodiment 4 in the invention.

FIG. 11 is a block diagram showing a configuration of a speech recognition device according to Embodiment 4 in the invention. In FIG. 11, a recognition language setting unit 1, an utterance button 3, a microphone 4, and a monitor 5 are the same configurations as those in FIG. 1 described in the above Embodiment 1. A speech recognition processing unit 2C in Embodiment 4 has a recognition engine selection unit 21a, a speech recognition engine storage unit 22, a speech recognition unit 23c, a speech recognition control unit 24c, a speech recognition dictionary storage unit 25, a display control unit 26, a reading information conversion unit 27a, a reading information generation unit 27b, a reading information conversion data base storage unit 28a, and a reading information generation data base storage unit 28b.

It is noted that in the speech recognition processing unit 2C, the recognition engine selection unit 21a, the speech recognition engine storage unit 22, the speech recognition dictionary storage unit 25, and the display control unit 26 are the same configurations as those in FIG. 1 described in the above Embodiment 1 and in FIG. 4 described in the above Embodiment 2.

The speech recognition control unit 24c is a constitutional part that selects the recognition subject word information G of the recognition subject vocabulary to be used at the current recognition processing out of the recognition subject word information E of the speech recognition dictionary stored in the speech recognition dictionary storage unit 25, if an utterance commencement notification D is input, and outputs the information to the speech recognition unit 23*c*.

Also, if a word in a language that is different from the predetermined language is included in the recognition subject vocabulary to be used at the current recognition processing, the speech recognition control unit 24*c* selects the recognition subject word information of the word in the corresponding different language out of the recognition subject word information E, and outputs the information to the reading information conversion unit 27*a* and the reading information generation unit 27*b*, respectively, as different language recognition subject word information K. In such a way, the speech recognition control unit 24*c* performs control such that the speech recognition unit 23*c* performs the speech recognition that makes reference to the recognition subject word after conversion of the reading information by the reading information conversion unit 27*a* and the recognition subject vocabulary after generation of the reading information by the reading information generation unit 27*b*.

The reading information conversion unit 27*a* is a constitutional part that converts the reading information of the word in the corresponding different language included in the different language recognition subject word information K input from the speed recognition control unit 24*c* into the reading information in the predetermined language in accordance with the reading information conversion rule L to be read from the reading information conversion data base storage unit 28*a*. The recognition subject word information after the conversion into the reading information in the predetermined language is output to the speech recognition unit 23*c* as after-reading-conversion recognition subject word information M.

The reading information conversion database storage unit 28*a* is a storage part that stores a reading information conversion data base as shown in FIG. 5, for example. In the reading information conversion data base, the reading information conversion rule L that indicates a correspondence of the reading information of the words among a plurality of languages is stored.

The reading information generation unit 27*b* is a constitutional part that generates reading information of the corresponding word in the predetermined language based on the reading information generation rule N read from the reading information generation data base storage unit 28*b*, by referring to the writing information of the word in the corresponding different language included in the different language recognition subject word information K input from the speech recognition control unit 24*c*. The recognition subject word information after generation of the reading information in the predetermined language is output to the speech recognition unit 23*c* as after-reading-generation recognition subject word information O.

The reading information generation database storage unit 28*b* is a storage part that stores a reading information generation data base as shown in FIG. 9, for example. In the reading information generation data base, a reading information generation rule N that indicates a correspondence between the writing information of a word in one language among a plurality of languages, and the reading information in another language is stored.

The speech recognition unit 23*c* is a constitutional part that executes the speech recognition engine C selected by the recognition engine selection unit 21*a*, and performs speech recognition processing for a speech signal H input from the user through the microphone 4, by referring to the recognition subject word information G selected by the speech recognition control unit 24*c*, the recognition subject word information M after the conversion of the reading information by the reading information conversion unit 27*a*, and the recognition subject word information O after the generation of the reading information by the reading information generation unit 27*b*. The recognition result information I acquired as a result of the recognition processing by the speech recognition unit 23*c* is transmitted from the speech recognition unit 23*c* to the display control unit 26.

Further, when a speech recognition program in accordance with the purport in the invention is executed by a computer, the recognition engine selection unit 21*a*, the speech recognition engine storage unit 22, the speech recognition unit 23*c*, the speech recognition control unit 24*c*, the speech recognition dictionary storage unit 25, the display control unit 26, the reading information conversion unit 27*a*, the reading information generation unit 27*b*, the reading information conversion data base storage unit 28*a*, and the reading information generation data base storage unit 28*b* can be achieved on a computer as a specific means cooperating hardware and software.

Next, an operation thereof will be described.

Figure 12:
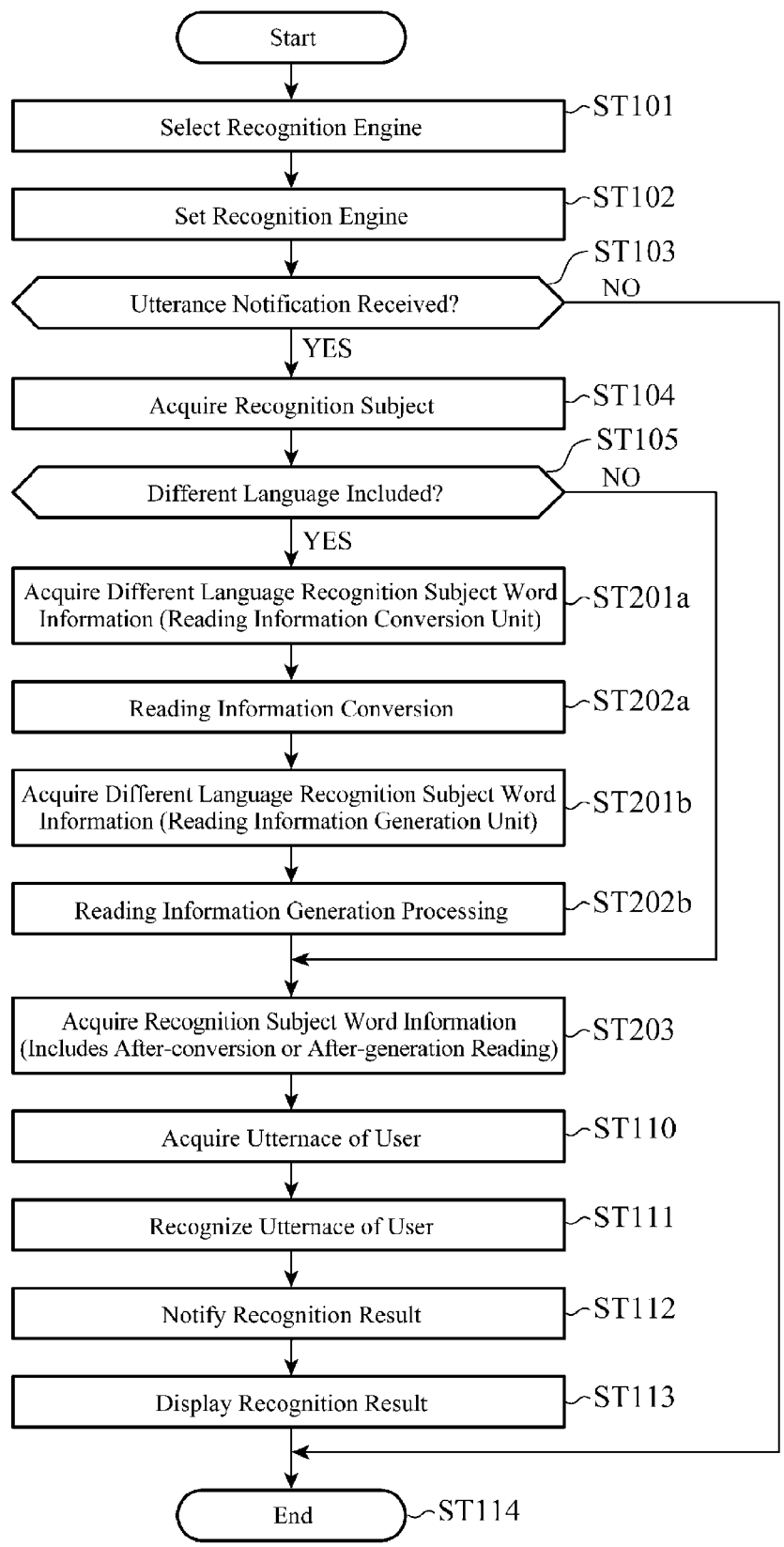
FIG. 12 is a flow chart showing an operation flow according to the speech recognition device in Embodiment 4.

FIG. 12 is a flow chart showing an operation flow according to the speech recognition device in Embodiment 4, especially showing the details of the processing by the speech recognition processing unit 2C. In FIG. 12, processes of step ST101 to step ST105 are the same as the contents of the processes in FIG. 3 described in the above Embodiment 13.

If a word in a different language is included in the recognition subject vocabulary (step ST105: YES), the speech recognition control unit 24*c* refers to the recognition subject word information E of the speech recognition dictionary stored in the speech recognition dictionary storage unit 25, and acquires the different language recognition subject word information K of the word in the corresponding different language, and outputs the information to the reading information conversion unit 27*a* (step ST201*a*).

If the reading information conversion unit 27*a* specifies the reading information conversion rule L between the predetermined language and the different language by referring to the reading information conversion data base storage unit 28*a* when the word in the different language recognition subject word information K input from the speech recognition control unit 24*c* is used as a key, the unit converts the reading information of the recognition subject word that is extracted from the different language recognition subject word information K into the reading information in the predetermined language in accordance with to the corresponding reading information conversion rule L (step ST202*a*).

Subsequently, the speech recognition control unit 24*c* outputs the corresponding different language recognition subject word information K to be acquired by referring to the recognition subject word information E of the speech recognition dictionary stored in the speech recognition dictionary storage unit 25 to the reading information generation unit 27*b* (step ST201*b*).

If the reading information generation unit 27*b* specifies the reading information generation rule N between the predetermined language and the different language by referring to the reading information generation data base storage unit 28*b* with the word in the different language recognition subject word information K input from the speech recognition control unit 24*c* as a key, the unit generates the reading information in the predetermined language based on the reading information generation rule N by referring to the writing information of the recognition subject word extracted from the different language recognition subject word information K (step ST202*b*).

On the other hand, if the word in the different language is not included in the recognition subject vocabulary (step ST105: NO), the processing moves to step ST203, and processes of step ST201a to step ST202a, and processes of step ST201b to step ST202b are not executed.

At step ST203, the speech recognition unit 23c acquires the recognition subject word information G selected at step ST104 from the speech recognition control unit 24c, and acquires the recognition subject word information M after the reading conversion by the reading information conversion unit 27a and the recognition subject word information O after the reading generation by the reading information generation unit 27b.

Next, if the speech signal H from the user input through the microphone 4 is acquired (step ST110), the speech recognition unit 23c executes the speech recognition engine C, and performs speech recognition for which word the user uttered by referring to the recognition subject word information G, the recognition subject word information M, and the recognition subject word information O, according to the method described in Chapter 5 of Reference Document 1 mentioned above (step ST111).

Even if the recognition subject vocabulary includes a word in a language that is different from the predetermined language (different language), the speech recognition unit 23c executes the speech recognition engine C corresponding to the predetermined language, and performs recognition processing using the recognition subject word information M after conversion into the reading information in the predetermined language and the recognition subject word information O after generation of the reading information in the predetermined language.

If the recognition processing is completed, the speech recognition unit 23c outputs the recognition result information I of the corresponding processing to the display control unit 26 (step ST112). The display control unit 26 presents the writing information J included in the recognition result information I to the user through the monitor 5 as a recognition result (step ST113), and the system ends the processing (step ST114).

As described above, according to Embodiment 4, the speech recognition device includes: the reading information conversion data base in which the reading information conversion rule L is registered; the reading information conversion unit 27a that converts the reading information of a word between languages based on the reading information conversion rule L; the reading information generation data base in which the reading information generation rule N is registered; and the reading information generation unit 27b that generates the reading information in another language from the writing information of a word in one language based on the reading information generation rule N, and if a word in a language that is different from the predetermined language (different language) is included in the recognition subject vocabulary to be referred to by the speech recognition unit 23c, the speech recognition control unit 24c performs control such that the reading information generation unit 27a generates the reading information in the predetermined language from the writing information in the corresponding different language, and that the reading information conversion unit 27b converts the reading information in the different language into the reading information in the predetermined language, and that the speech recognition unit 23c performs the speech recognition that makes reference to the recognition subject word information in the corresponding word including the reading information in the generated predetermined language.

As mentioned above, by virtue of the generation of the two types of reading information corresponding to the predetermined language from both the writing and reading information of the word in the different language that is different from the predetermined language, the speech recognition becomes possible whether the user utters a pronunciation close to a pronunciation in the above different language that is different from the predetermined language, or a pronunciation close to a pronunciation in the predetermined language. Also, there is an advantage such that since this reading information can be generated in a real-time processing, the reading information in the predetermined language that corresponds to the word in the above different language that is different from the predetermined language need not be stored in the speech recognition dictionary in advance.

Embodiment 5

In Embodiment 5, if a word in a language that is different from a predetermined language (different language) is included in a recognition subject vocabulary and also the word includes a special character writing unique to the corresponding different language, the word is converted into the writing in the predetermined language, and thereafter, reading information in the predetermined language is generated based on the writing, and with the reading information, the corresponding word is recognized by the speech recognition engine in the predetermined language.

Figure 13:
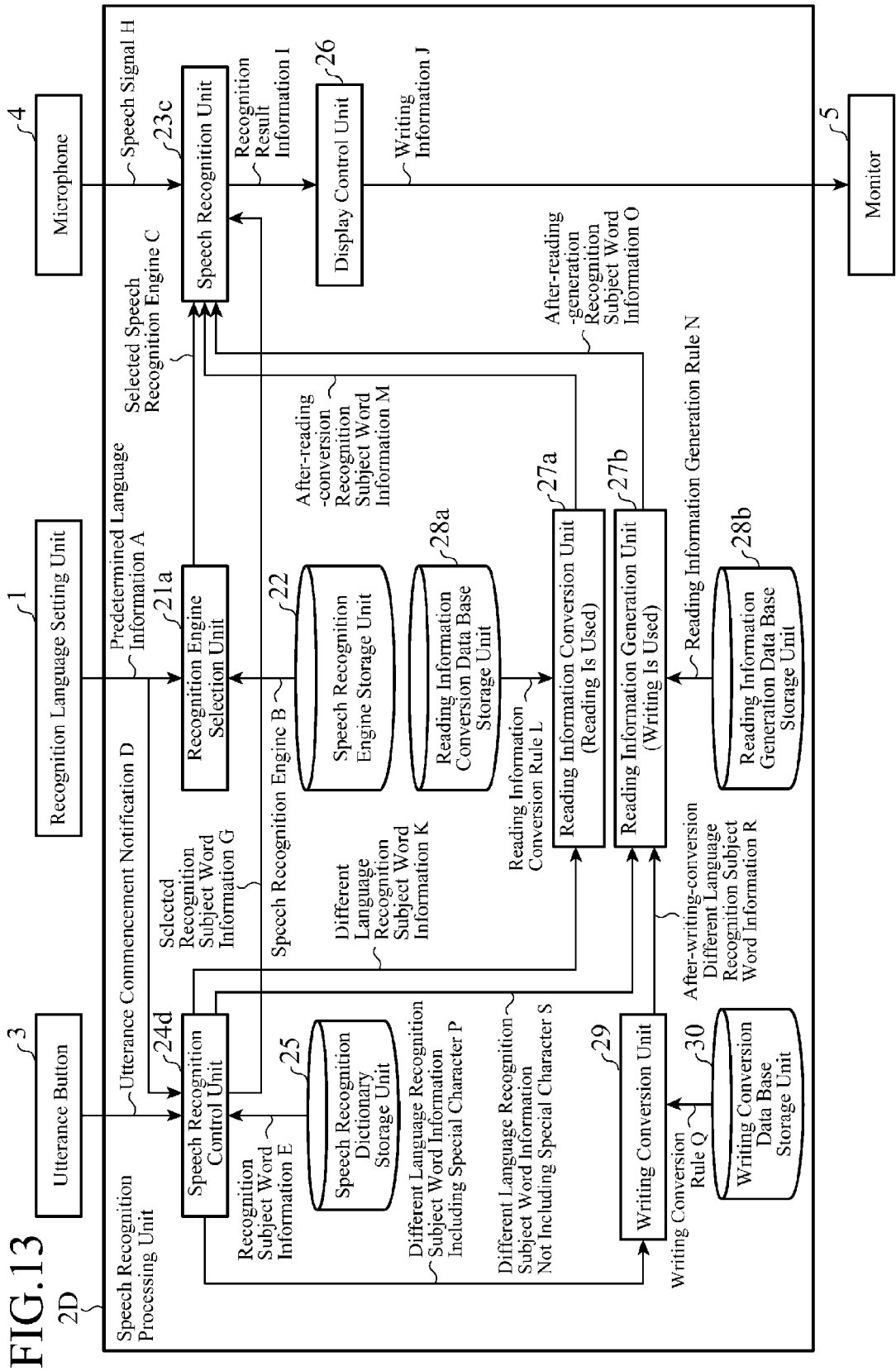
FIG. 13 is a block diagram showing a configuration of a speech recognition device according to Embodiment 5.

FIG. 13 is a block diagram showing a configuration of a speech recognition device according to Embodiment 5 in the invention. In FIG. 13, a recognition language setting unit 1, an utterance button 3, a microphone 4, and a monitor 5 are the same configurations as those in FIG. 1 described in the above Embodiment 1. A speech recognition processing unit 2D in Embodiment 5 has a recognition engine selection unit 21a, a speech recognition engine storage unit 22, a speech recognition unit 23c, a speech recognition control unit 24d, a speech recognition dictionary storage unit 25, a display control unit 26, a reading information conversion unit 27a, a reading information generation unit 27b, a reading information conversion data base storage unit 28a, a reading information generation data base storage unit 28b, a writing conversion unit 29, and a writing conversion data base storage unit 30. It is noted that in the speech recognition processing unit 2D, the recognition engine selection unit 21a, the speech recognition engine storage unit 22, the speech recognition dictionary storage unit 25 and the display control unit 26 are the same configurations as those in FIG. 1 described in the above Embodiment 1 and in FIG. 4 described in the above Embodiment 2. Also, the speech recognition unit 23c is the same configuration as that in FIG. 11 described in the above Embodiment 4.

The speech recognition control unit 24d is a constitutional part that selects the recognition subject word information G of the recognition subject vocabulary to be used at the current recognition processing, out of the recognition subject word information E of the speech recognition dictionary stored in the speech recognition dictionary storage unit 25, if an utterance commencement notification D is input, and outputs the information to the speech recognition unit 23c.

Also, if a word in a language that is different from the predetermined language is included in the recognition subject vocabulary to be used at the current recognition processing, the speech recognition control unit 24d selects recognition subject word information of the corresponding word in the corresponding different language out of the recognition subject word information E, and outputs the information to the reading information conversion unit 27a as different language recognition subject word information K.

Further, if a special character writing unique to the corresponding different language is included in the writing information included in the word in the corresponding different language selected from the recognition subject word information E, the speech recognition control unit 24d outputs the recognition subject word information that includes the corresponding special character out of the recognition subject word information of the word in the different language selected from the recognition subject word information E to the writing conversion unit 29 as recognition subject word information P, and outputs the recognition subject word information that does not include the corresponding special character to the reading information generation unit 27b as recognition subject word information S.

In such a way, the speech recognition control unit 24d performs control such that the speech recognition unit 23c performs the speech recognition that makes reference to the recognition subject word information of the word in the different language in which the reading information is converted by the reading information conversion unit 27a, and in which the reading information is generated by the reading information generation unit 27b.

The reading information conversion unit 27a is a constitutional part that converts the reading information of the word in the corresponding different language included in the different language recognition subject word information K input from the speech recognition control unit 24d into the reading information in the predetermined language in accordance with the reading information conversion rule L to be read from the reading information conversion data base storage unit 28a. The recognition subject word information after the conversion into the read information in the predetermined language is output to the speech recognition unit 23c as after-reading-conversion recognition subject word information M.

The reading information conversion data base storage unit 28a is a storage part that stores a reading information conversion data base as shown in FIG. 5, for example. In the reading information conversion data base, the reading information conversion rule L that indicates a correspondence of the reading information of words among a plurality of languages is stored.

The reading information generation unit 27b is a constitutional part that generates the reading information of the corresponding recognition subject word in the predetermined language, based on the reading information generation rule N read from the reading information generation data base storage unit 28b, by referring to the different language recognition subject word information S that does not include the special character input from the speech recognition control unit 24d, and the writing information of the word in the corresponding different language included in the recognition subject word information R of the word in the different language after conversion of the writing by the writing conversion unit 29. The recognition subject word information after generation of the reading information in the predetermined language is output to the speech recognition unit 23c as after-reading-generation recognition subject word information O.

The reading information generation data base storage unit 28b is a storage part that stores a reading information generation data base as shown in FIG. 9, for example. In the reading information generation data base, unlike the above Embodiments 3 and 4, in addition to a correspondence between the writing information of the word in one language among a plurality of languages and the reading information thereof in another language, the reading information generation rule N that includes a correspondence between the writing information and reading information in a same language is stored, By referring to the different language recognition subject word information P including the special character input from the speech recognition control unit 24d, the writing conversion unit 29 is a constitutional part that converts the writing information of a special character unique to the different language into the writing information in the predetermined language based on writing conversion rule Q read from the writing conversion database storage unit 30. The different language recognition subject word information after conversion of the writing by the writing conversion unit 29 is output to the reading information generation unit 27b as the different language recognition subject word information R.

The writing conversion database storage unit 30 is a storage part that stores the writing conversion data base. In the writing conversion data base, the writing conversion rule Q that indicates correspondence between the writing information of the special character unique to one language among the plurality of languages and the writing information in another language is stored.

FIG. 14 is a diagram showing one example of the writing conversion data base, and shows the writing conversion rule Q in which the writing information of a special character unique to German and the corresponding writing information thereof in English are registered. For example, if a writing of a character with an umlaut is included in a word in German (different language), the writing information is converted into the corresponding writing information in English in accordance with the writing conversion rule Q in FIG. 14. It is noted that FIG. 14 shows writings in English to make pronunciations in English appropriate. The after-conversion language, not limited to English or to a language based on alphabetical notation, may be any language including Japanese, Chinese, or the like, when a conversion rule for the corresponding language is prepared.

Further, when a speech recognition program in accordance with the purport in the present invention is executed by a computer, the recognition engine selection unit 21a, the speech recognition engine storage unit 22, the speech recognition unit 23c, the speech recognition control unit 24d, the speech recognition dictionary storage unit 25, the display control unit 26, the reading information conversion unit 27a, the reading information generation unit 27b, the reading information conversion data base storage unit 28a, the reading information generation data base storage unit 28b, the writing conversion unit 29, and the writing conversion data base storage unit 30 can be achieved on a computer as a specific means cooperating hardware and software.

Next, an operation thereof will be described.

Figure 15:
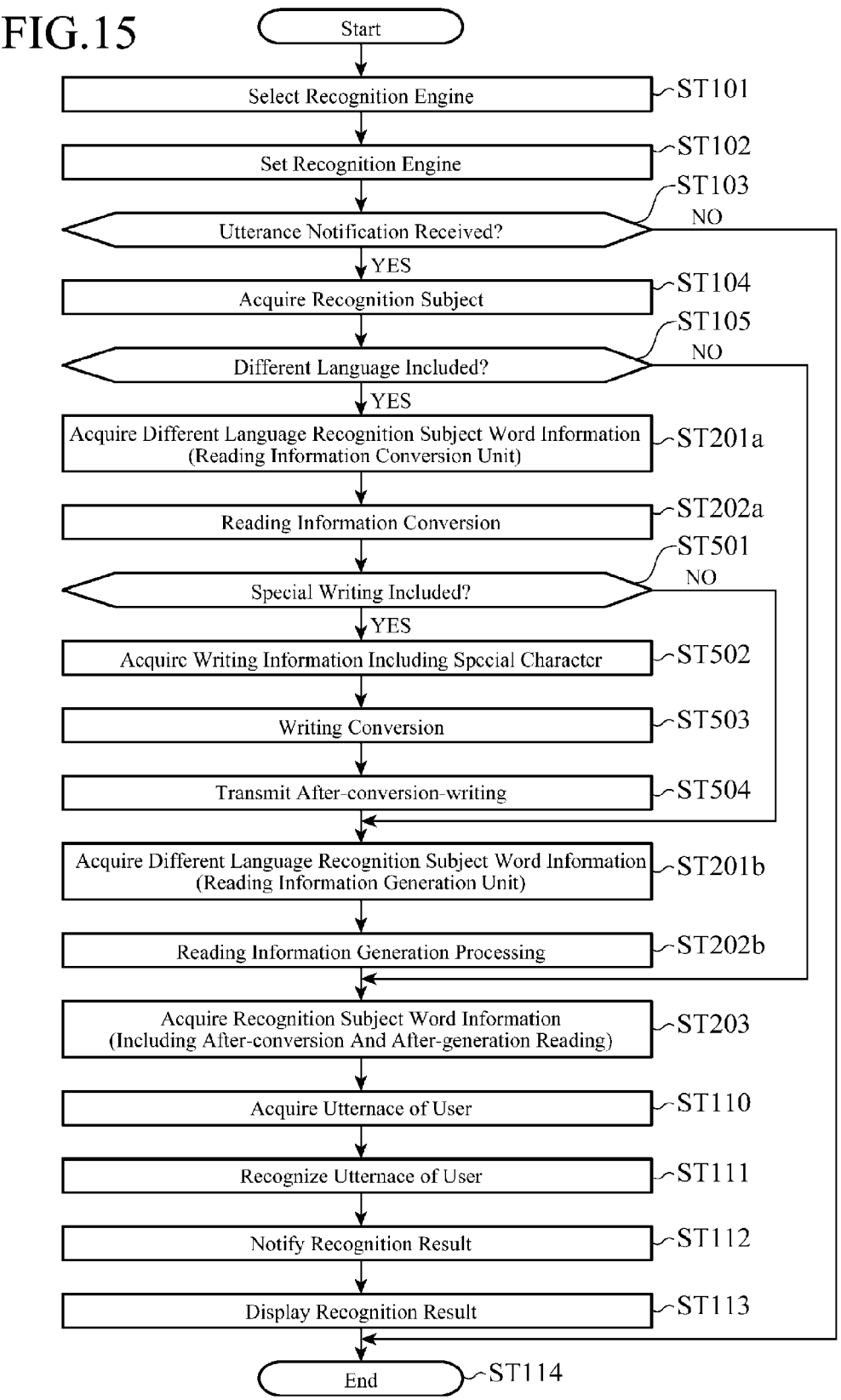
FIG. 15 is a flow chart showing an operation flow according to the speech recognition device in Embodiment 5.

FIG. 15 is a flow chart showing an operation flow according to the speech recognition device in Embodiment 5, especially showing the details of the processing according to the speech recognition processing unit 2D. In FIG. 15, processes of step ST101 to step ST105 are the same as the contents of the processes in FIG. 3 described in the above Embodiment 1.

If a word in a different language is included in the recognition subject vocabulary (step ST105: YES), the speech recognition control unit 24d refers to the recognition subject word information F of the speech recognition dictionary stored in the speech recognition dictionary storage unit 25, and acquires the different language recognition subject word information K of the word in the corresponding different language, and outputs the information to the reading information conversion unit 27a (step ST201a).

The reading information conversion unit 27a, by referring to the reading information conversion data base storage unit 28a with the word in the different language recognition subject word information K input from the speech recognition control unit 24d as a key, specifies the reading information conversion rule L, and then converts the reading information of the word extracted from the different language recognition subject word information K into the reading information in the predetermined language in accordance with the corresponding reading information conversion rule L (step ST202a).

Then, by referring to the writing information in the different language recognition subject word information K, the speech recognition control unit 24d determines whether a word having a special character writing unique to the corresponding different language is included in the different language recognition subject word information K (step ST501). At this point, if the word having the special character writing is included (step ST501: YES), the speech recognition control unit 24d outputs the different language recognition subject word information P that includes the corresponding special character to the writing conversion unit 29 (step ST502).

By referring to the writing conversion data base storage unit 30 with the writing information on the corresponding special character extracted from the different language recognition subject word information P as a key, the writing conversion unit 29 specifies the writing conversion rule Q that indicates a correspondence between the writing information of the corresponding special character and the writing information in the predetermined language, and converts the writing information of the corresponding special character into the writing information in the predetermined language based on the corresponding writing conversion rule Q read from the writing conversion data base storage unit 30 (step ST503). Thereafter, the writing conversion unit 29 outputs the different language recognition subject word information R after conversion of the writing to the reading information generation unit 27b (step ST504).

Figure 16:
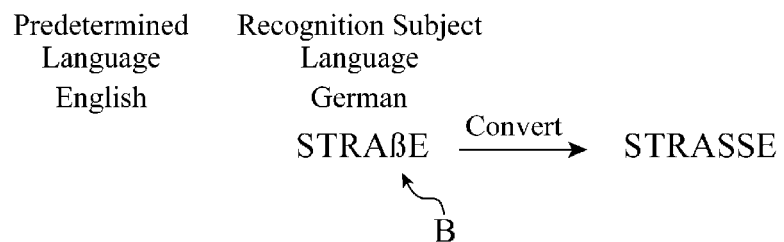
FIG. 16 is a diagram for illustrating a process for converting writing information of a special character into writing information in the predetermined language.

FIG. 16 is a diagram for illustrating a process for converting the writing information of a special character into the writing information in the predetermined language, where the predetermined language is English and the different language included in the recognition subject vocabulary is German. If the writing of a word in German (different language) is the one denoted by a reference symbol B in FIG. 16, the writing information A in German is converted into the writing information "STRASSE" in English in accordance with the writing conversion rule Q as shown in FIG. 14.

Subsequently, the speech recognition control unit 24d acquires the different language recognition subject word information S that does not include the above special character from the different language recognition subject word information K, and outputs the information to the reading information generation unit 27b (step ST201b).

The reading information generation unit 27b, by referring to the reading information generation database storage unit 28b with the words in the different language recognition subject word information R after writing conversion by the writing conversion unit 29 and in the different language recognition subject word information S input from the speech recognition control unit 24d and including no special character as a key, specifies the reading information generation rule N of the predetermined language and the different language, and then generates the reading information in the predetermined language based on the corresponding reading information generation rule N by referring to the writing information of the corresponding word extracted from the different language recognition subject word information R and the different language recognition subject word information S (step ST202b).

It is noted that in the different language recognition subject word information R after the writing conversion, the writing information of the special character unique to the different language is converted into the writing information in the predetermined language. In this case, the reading information generation unit 27b generates the reading information based on the correspondence between the writing information and the reading information in the predetermined language in the reading information generation rule N. For example, in the case of the example shown in FIG. 16, the writing information A in German is converted into the writing information "STRASSE" in English, and thereby the reading information corresponding to the writing information "STRASSE" in English is generated from the reading information generation rule N representing the correspondence between the writing information in English and the reading information.

On the other hand, if the word in the different language is not included in the recognition subject vocabulary (step ST105: NO), the processing moves to step ST203, and processes of step ST201a to step ST202a, processes of step ST501 to step ST504, and processes of step ST201b to step ST202b are not executed.

Also, If the word having the writing of the special character writing is not included (step ST501: NO), the processing moves to step ST201b, and processes of step ST502 to step ST504 are not executed.

At step ST203, the speech recognition unit 23c acquires the recognition subject word information G selected at step ST104 from the speech recognition control unit 24d, and also acquires both the recognition subject word information M after reading conversion by the reading information conversion unit 27a and the recognition subject word information O after reading generation by the reading information generation unit 27b.

Then, if the speech signal H from the user input through the microphone 4 is acquired (step ST110), the speech recognition unit 23c executes the speech recognition engine C, and performs speech recognition for which word the user uttered by referring to the recognition subject word information G by the method described in Chapter 5 of Reference Document 1 mentioned above (step ST111).

Even if the recognition subject vocabulary includes the word in the language that is different from the predetermined language (different language), the speech recognition unit 23c executes the speech recognition engine C corresponding to the predetermined language, and performs recognition processing using the recognition subject word information M after conversion into the reading information in the predetermined language and the recognition subject word information O after generation of the reading information in the predetermined language.

If the recognition processing is completed, the speech recognition unit 23c outputs the recognition result information I of the corresponding processing to the display control unit 26 (step ST112). The display control unit 26 presents the writing information J included in the recognition result information I to the user through the monitor 5 as a recognition result (step ST113), and the system ends the processing (step ST114).

As described above, according to Embodiment 5, in addition to the configuration shown in FIG. 2, the speech recognition device includes: the reading information generation database in which the reading information generation rule N that indicates a correspondence between the writing information of a word in one language among a plurality of languages and the reading information on another language, and a correspondence between the writing information and reading information in the same language is registered; the reading information generation unit 27b that generates the reading information from the writing information of the word based on the reading information generation rule N; the writing conversion data base in which the writing conversion rule Q that indicates a correspondence between writing information of a special character unique to the one language among the plurality of languages and writing information in the another language is registered; and the writing conversion unit 29 that converts the writing information of the word among the languages based on the writing conversion rule Q, and if a word in a different language that is different from the predetermined language is included in the recognition subject vocabulary to be referred to by the speech recognition unit 23c, and the word has writing information of a special character unique to the corresponding different language, the speech recognition control unit 24d performs control such that the writing conversion unit 29 converts the writing information of the corresponding special character into writing information in the predetermined language, and that the reading information generation unit 27b generates reading information in the predetermined language from the writing information of the word after the conversion by the writing conversion unit 29 based on the correspondence between the writing information and reading information in the predetermined language in the reading information generation rule N, and that the speech recognition unit 23c performs the speech recognition with reference to the word after the generation of the corresponding reading information.

As mentioned above, if the writing information of the word in the different language which is different from the predetermined language and which includes the special character unique to the corresponding different language is converted into the writing information in the predetermined language, and two types of the reading information corresponding to the predetermined language are generated from both the reading information and the writing information of the word that includes the after-conversion writing information, the user can performs speech recognition whether an uttered pronunciation is close to a pronunciation in the above different language (language of recognition subject country) that is different from the predetermined language, or whether the uttered pronunciation is close to a pronunciation in the predetermined language. Also, there is an advantage such that since this reading information can be generated in a real-time processing, the reading information in the predetermined language that corresponds to the word in the above different language that is different from the predetermined language need not be stored in the speech recognition dictionary in advance.

For example, in the case where Embodiment 5 is applied to a speech recognition device of a car navigation system, the corresponding vehicle is traveling in country A having a native tongue different from a predetermined language, and a "geographical name" in the country A is subjected to speech recognition, if the geographical name is written with a special character unique to the language of the country A, the user cannot utter the corresponding geographical name unless the user knows how to read the corresponding character. In this case, in Embodiment 5, the speech recognition control unit 24d acquires the recognition subject word information of the recognition subject vocabulary for the corresponding geographical name from the speech recognition dictionary, and outputs the information to the writing conversion unit 29, and the writing conversion unit 29 converts the writing information of the corresponding geographical name in the country A into the writing information in the predetermined language based on the writing conversion rule Q. From the after-conversion writing information in the predetermined language, the reading information generation unit 27b generates the reading information in the predetermined language. In such a way, the user can utter the corresponding geographical name in the country A using a pronunciation of the predetermined language, whereby the speech recognition of the corresponding geographical name becomes possible.

It is noted that in the present invention, the embodiments can be freely combined with each other, or any component of each embodiment can be modified or any component of each embodiment can be omitted, within the scope of the invention.

INDUSTRIAL APPLICABILITY

Since the speech recognition device of the present invention eliminates a large capacity storage means and enables speech recognition corresponding to a plurality of languages in a real-time processing, it is suitable for a speech recognition device in a vehicle-mounted navigation system that has to recognize geographical names in the plurality of languages.

The invention claimed is:

1. A speech recognition device, comprising:
 a microphone that converts an input speech into an electric signal;
 a speech recognizer to perform speech recognition for said electric signal with a speech recognition engine corresponding to a predetermined language that is a language that is set in advance as a recognition subject by referring to recognition subject word information including writing information and reading information of each recognition subject word included in a recognition subject vocabulary registered in a speech recognition dictionary;
 a first memory to store a reading information generation data base in which a reading information generation rule that indicates a correspondence between writing information of a word in one language among a plurality of languages and reading information thereof in another language is registered;
 a reading information generator to generate the reading information of the word in the another language from the writing information in the one language based on the reading information generation rule of the reading information generation data base; and
 a controller to perform control such that, when a word in a different language that is different from the predetermined language is included in the recognition subject vocabulary, the reading information generator generates the reading information in the predetermined language from the writing information in the different language, and that the speech recognizer performs speech recognition that makes reference to the recognition subject word information of the corresponding word, including the generated reading information in the predetermined language.

2. The speech recognition device according to claim 1, further comprising:
 a second memory to store a reading information conversion data base in which a reading information conversion rule indicating a correspondence of reading information of a word among a plurality of languages is registered; and
 a reading information converter to convert the reading information of the word among the languages based on the reading information conversion rule of the reading information conversion data base, wherein the controller performs control such that, when a word in the different language is included in the recognition subject vocabulary, the reading information converter converts the reading information of the corresponding word in the different language into the reading information thereof in the predetermined language, and that the speech recognizer performs speech recognition that makes reference to the recognition subject word information including the converted reading information in the predetermined language.

3. A speech recognition device, comprising:

a speech recognizer to perform speech recognition for input speech with a speech recognition engine corresponding to a predetermined language that is a language that is set in advance as a recognition subject by referring to recognition subject word information including writing information and reading information of each recognition subject word included in a recognition subject vocabulary registered in a speech recognition dictionary;

a first memory to store a reading information conversion data base in which a reading information conversion rule indicating a correspondence of reading information of a word among a plurality of languages is registered;

a reading information converter to convert the reading information of the word among the languages based on the reading information conversion rule of the reading information conversion data base;

a controller to perform control such that, when a word in a different language that is different from the predetermined language is included in the recognition subject vocabulary, the reading information converter converts reading information in the different language into reading information in the predetermined language, and that the speech recognizer performs speech recognition that makes reference to recognition subject word information of the corresponding word including the converted reading information in the predetermined language;

a second memory to store a reading information generation data base in which a reading information generation rule indicating a correspondence between writing information of the word in one language among the plurality of languages and reading information in another language, and a correspondence between writing information and reading information in a same language are registered;

a reading information generator to generate read information from the writing information of the word, based on the reading information generation rule of the reading information generation data base;

a third memory to store a writing conversion data base in which a writing conversion rule indicating a correspondence between writing information of a special character unique to the one language among the plurality of languages and writing information in the another language is registered; and a writing converter to convert the writing information of the word among the languages based on the writing conversion rule of the writing conversion data base, wherein the controller performs control such that, when the recognition subject vocabulary includes a word of the different language such that the word has the writing information of a special character unique to the different language, the writing converter converts the writing information of the special character into the writing information in the predetermined language, and that the reading information generator generates reading information in the predetermined language from the writing information in the predetermined language after the conversion by the writing converter, based on the correspondence between the writing information and the reading information in the predetermined language in the reading information generation rule, and that the speech recognizer performs speech recognition that makes reference to the recognition subject word information of the corresponding word including the generated reading information in the predetermined language.

* * * * *